United States Patent [19]

Gold et al.

[11] Patent Number: 4,748,679

[45] Date of Patent: May 31, 1988

[54] WEIGHTED-PIXEL CHARACTERISTIC SENSING SYSTEM

[75] Inventors: David G. Gold, Santa Monica; Vahakn K. Gharibian, Los Angeles, both of Calif.

[73] Assignee: Light Signatures, Inc., Los Angeles, Calif.

[21] Appl. No.: 889,575

[22] Filed: Jul. 25, 1986

[51] Int. Cl.⁴ .............................................. G06K 9/58
[52] U.S. Cl. ........................................ 382/61; 382/54; 340/825.34; 235/380
[58] Field of Search ...................... 382/54, 32, 31, 34, 382/27, 7, 50, 52, 61; 250/578, 550; 340/825.34; 235/380

[56] References Cited

U.S. PATENT DOCUMENTS

| | | | |
|---|---|---|---|
| 4,282,510 | 8/1981 | Southgate | 250/550 |
| 4,282,511 | 8/1981 | Southgate et al. | 382/31 |
| 4,328,426 | 5/1982 | D'Ortenzio | 382/34 |
| 4,330,775 | 5/1982 | Iwamoto | 382/31 |
| 4,424,587 | 1/1984 | Wevelsiep | 382/61 |
| 4,476,468 | 10/1984 | Goldman | 340/825.34 |
| 4,489,318 | 12/1984 | Goldman | 340/825.34 |
| 4,527,051 | 7/1985 | Stenzel | 340/825.34 |
| 4,559,644 | 12/1985 | Kataoka | 382/61 |
| 4,577,235 | 3/1986 | Kannapell | 358/282 |
| 4,630,845 | 12/1986 | Sanner | 340/825.34 |

Primary Examiner—Leo H. Boudreau
Assistant Examiner—A. Anne Skinner
Attorney, Agent, or Firm—Nilsson, Robbins, Dalgarn, Berliner, Carson & Wurst

[57] ABSTRACT

A system for sensing a characteristic of a document, e.g. translucency, by using radiation from the document at a specific window area. The identified window area is illuminated to provide radiation from the area which is sensed by pixel dissection so that pixels of central location in the window area are weighted for greater significance. The pixel weighting attributes greater significance to the central portion of the defined area thereby increasing the tolerance of the system to misalignment of the window area. The observed characteristic is reduced to signal representations which are compared with registered values as to authenticate the document. Pixel-weighting techniques include overlapped pixels, filtered pixels and algebraically weighted pixels.

14 Claims, 4 Drawing Sheets

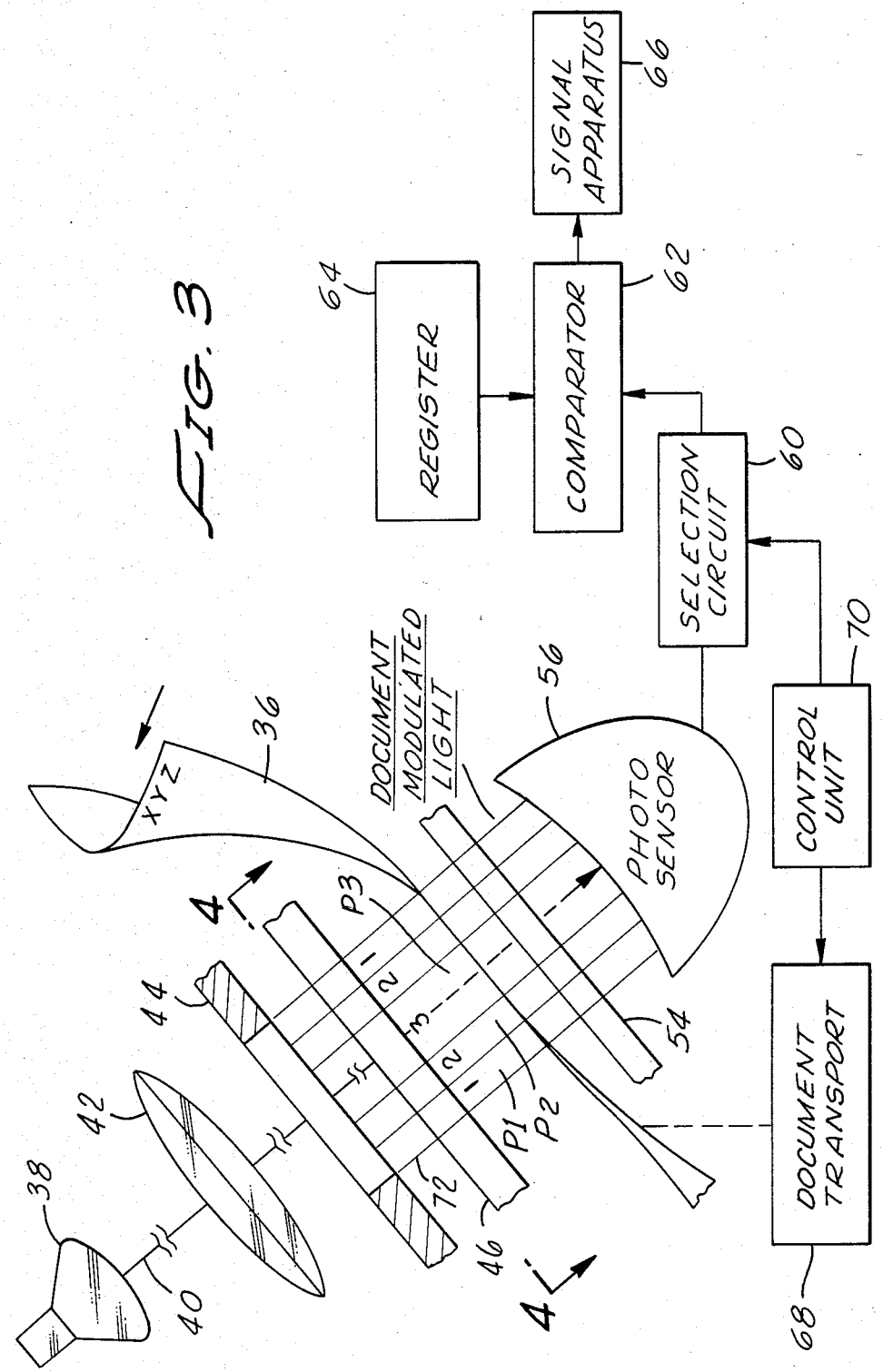

WEIGHTED-PIXEL CHARACTERISTIC SENSING SYSTEM

BACKGROUND AND SUMMARY OF THE INVENTION

Developments of recent years have produced an increasing need for systems to sense specific characteristics of various articles. For example, document authentication systems are in widespread use to sense a characteristic of a document for comparison with a registered standard. Certain forms of such systems identify documents by sensing a characteristic at a specific area or location on the document. Such systems have recognized various characteristics for identification, as characteristics involving light translucency, light reflectivity, emanating light type and so on. Exemplary forms of such systems are shown and described in U.S. Pat. Nos. 4,423,415 (Goldman) and 4,476,468 (Goldman). In relation to the present development, such systems essentially sense radiation emanating from a specified area of a document to obtain an indication of the document characteristic which is then compared with a reference to verify the authenticity of the document.

A problem typical of many systems for authenticating documents is that of locating a specific area from which the characteristic is to be sensed. For example, the observed characteristic might be the gross translucency of a specific area or window defined on the document. Consequently, authenticating the document necessitates locating the specific window. Of course, the window could be precisely marked or masked; however, such indicia is generally considered to compromise the security of the document. In some systems, it has been proposed to obscure the specific location of a characteristic window. Accordingly, for such systems to operate effectively, the window must be determined with a degree of precision for each sensing. Accurate location of the window is sometimes burdensome, particularly with respect to aged documents and systems utilizing a small window sometimes considered desirable. In general, the present invention involves a system for effectively and economically sensing a specific window of a document to provide reliable characteristic data.

In accordance with the present invention, a characteristic window is specified on a document which window can be dissected by a plurality of pixels. The system of the present invention then senses signal indications representative of the individual pixels, and the pixels are weighted so that those centrally located in the window are accorded greater significance. As a consequence, alignment on the specific window becomes less critical. Accordingly, the present development affords an improved system for sensing a discrete window (on a document for example) to provide a characteristic indication for the document that may be employed to authenticate the document.

BRIEF DESCRIPTION OF THE DRAWINGS

In the drawings, which constitute a part of this specification, exemplary embodiments of the invention are set forth as follows:

FIG. 3 is a schematic representation of a system constructed in accordance with the present invention;

DESCRIPTION OF THE ILLUSTRATIVE EMBODIMENTS

As indicated above, detailed illustrative embodiments of the present invention are disclosed herein. However, physical identification media, data formats, and operating system details in accordance with the present invention may be embodied in a wide variety of forms some of which may be quite different from those of the disclosed embodiments. Consequently, the specific structural and functional details disclosed herein are merely representative; yet in that regard they are deemed to afford the best embodiments for purposes of disclosure and to provide a basis for the claims herein which define the scope of the present invention.

Figure 1:
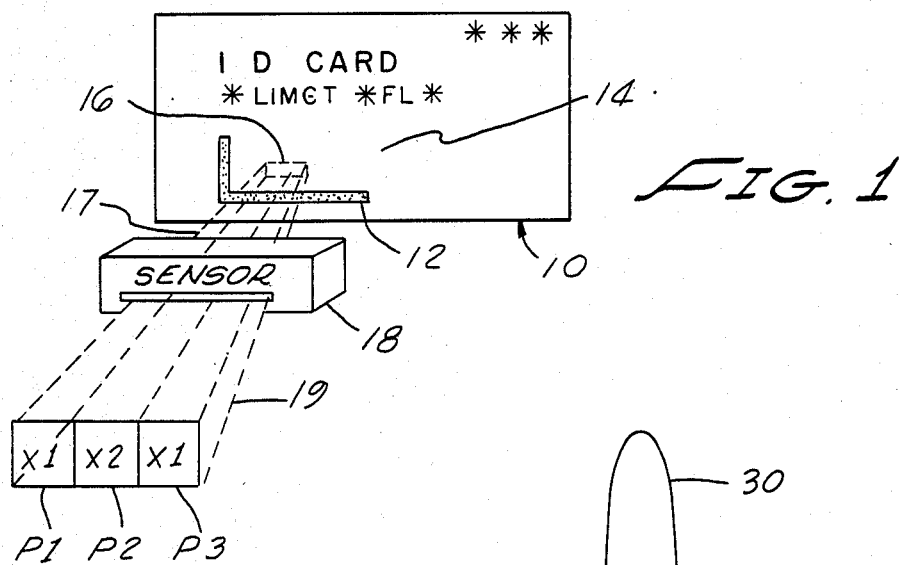
FIG. 1 is a diagrammatic view illustrative of the operation of the system of the present invention.

Referring initially to FIG. 1, a document is represented in the form of an I.D. card 10. Of course, the document might take various forms; however, with respect to the illustrative embodiments, the card 10 has a characteristic that is manifest by radiation directed to emanate from the document. For example, the card 10 may comprise paper with a variable translucency pattern as the characteristic employed by the illustrative embodiments.

Corner indicia 12 on the card 10 designates a sizable area or field 14 in which a characteristic window 16 is somewhat obscurely located. That is, the window 16 (designated by dashed lines) is not marked or indicated in any way but rather may be variously placed in the field 14 to be located by reference to the corner indicia 12. The translucency of the window 16 is a characteristic that is substantially individual to the card 10. Accordingly, that characteristic can be sensed repeatedly to identify the card 10.

In the graphic representation of FIG. 1, the characteristic of the window 16 is represented to be sensed by a beam 17 of radiation passing from the card 10 to a sensor 18. To illustrate the operation of the sensor 18, the beam 17 is dissected into pixels P1, P2 and P3 which are graphically depicted from the sensor 18 by weighted projections 19. Specifically, the graphic projections 19 represent the pixels P1, P2 and P3 with centrally weighted significance. The central pixel P2 is sensed with weighted significance in reference to the pixels P1 and P3. That is, the central portion of the window 16 as represented by the pixel P2 is weighted with respect to the external portions. Specifically, the pixels are weighted by factors: P1·1; P2·2 and P3·1.

Detailed techniques for accomplishing pixel weighting in accordance herewith are treated in detail below. However, conceptually, it is important to appreciate that by weighting the characteristic significance of the central portion of the window 16, the tolerance to shifts of the window 16 on the card 10 is increased. That is, the present development is based on recognizing that tolerance to displacements of the window 16 is increased by attributing weighted significance to the central portion of the window. The following explanation with reference to FIG. 2 analytically treats the considerations whereby pixel weighting reduces the criticality of window location.

Figure 2:
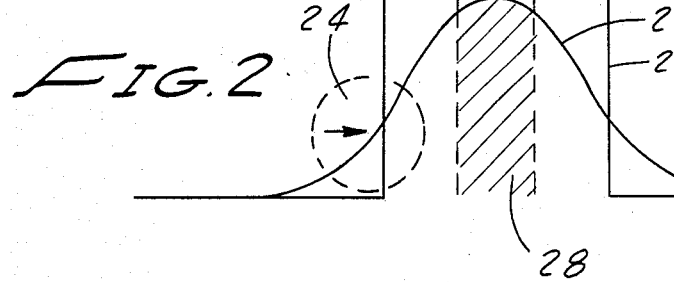
FIG. 2 is a diagram illustrative of principles of operation for a system in accordance with the present invention.

Referring to FIG. 2 a rectangular form 22 illustrates an idealized sensing of a window with a uniform light-translucency characteristic. Essentially, the area under the form 22 is a measure of the light observed to pass through the window. As an alternative measure of translucency, the amplitude of the form 22 could be sampled.

To consider a practical sensing of the assumed window a spot 24 represents the impinging area of a flying spot scanner as well known in television and related arts. Sensing the window with such an apparatus produces a curve 26. Again, assume that the flying spot 24 moves at a constant speed across the window and all values are fixed. The sloped portions of the curve 26 result from the spot 24 moving across the leading and trailing edges of the form 22. Measures of the window characteristic again might be the area under the curve 26 or the peak amplitude of that curve. In that regard, it may be seen that inherently some central weighting of the observation occurs due to the transitions. However, the system of the present invention contemplates increased weighting as indicated with respect to FIG. 1. Specifically, assume for example that the central shaded portion 28 of the form 22 is weighted to be accorded double significance. The result is the formation of a curve 30 superimposed on the curve 26. The significance of such central weighting will now be considered.

Essentially, weighting values taken at the center of the observed window emphasizes measurements that are most likely to be taken within the defined window. That is, during repeated observations the observed window may be displaced substantially from the defined window. However, a strong likelihood exists that the central portion of each observed window will fall within the defined window. Accordingly, the present invention is based on recognizing such a relationship and according weighted significance to the central portion of the window. Thus, as illustrated in FIGS. 1 and 2, dissecting a window into pixels and weighting the pixels to provide increased significance for central pixels reduces the criticality of precisely locating the window for each sensing operation. Such weighting may be variously accomplished. Exemplary techniques as disclosed herein involve filtering the radiant energy of sensing, overlapping pixels and arithmetic weighting.

Figure 4:
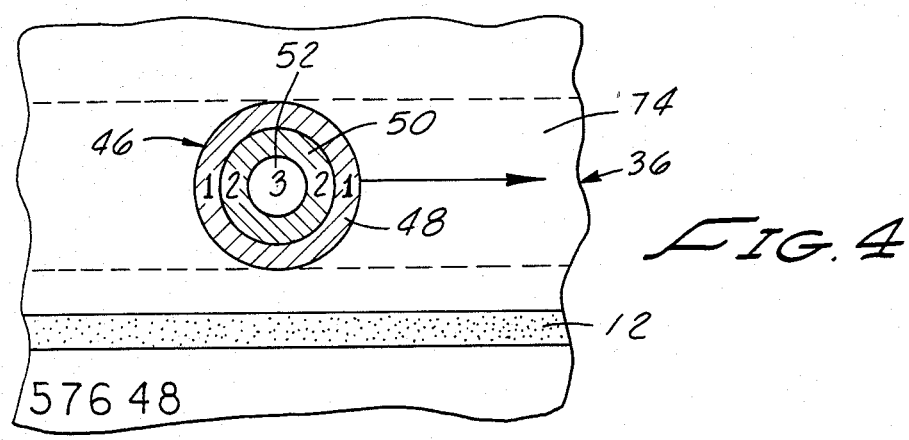
FIG. 4 is a fragmentary sectional view taken along a line 4—4 in the system illustrated in FIG. 3.

Referring now to FIG. 3, a document 36 is represented to be positioned in a light sensing apparatus as explained in detail below. The document 36 has a radiation-sensible characteristic as described above, specifically a pattern of varying translucency. It is illuminated by a lamp 38 providing a beam 40 represented by a dashed line. The beam 40 from the lamp 38 passes through a focusing lens 42, a mask 44 and a filter 46 before impinging on the document 36. The filter 46 comprises concentric sections of varying translucency as illustrated in FIG. 4. That is, an external ring 48 of the filter 46 reduces the illumination by two-thirds. An internal ring 50 reduces the illumination by one-third and the circular central area 52 of the filter 46 does not attenuate or reduce the light passed. Accordingly, the light passed by the various zones or sections of the filter 46 may be equated to a relationship of "one", "two" and "three". The intensities are thus illustrated in FIG. 3 sectionally by beam zones designated "one", "two" and "three". Physically, the designations indicate high intensity light in the central section represented as "three", lesser intensity light designated in the circle as "two" and still lesser intensity light in the circle designated as "one".

The beam, of multiple zones, provides illumination through the document 36 in accordance with the document's translucency. Note that for purposes of illustration the beam of light is greatly enlarged (with respect to the document 36) from the relative sizes of a typical situation.

Depending on the translucency (or opacity) of the document 36, degrees of the beam 40 pass through the document 36 to then pass through a filter 54 to impact on a photosensor 56. The filter 54 is similar to the filter 46 and accordingly further attenuates fragments of the beam lying in the external circles or rings as represented in FIGS. 3 and 4. Consequently, the radiation or light at the center of the beam is enhanced considerably with reference to the external rings. That is, if the total beam 40 passes through an area on the document 36 of consistent translucency, the light intensity at the center of the beam would be greatest followed by that at the adjacent ring and in turn followed by that at the external ring (see FIG. 4).

The photosensor 56 senses the radiation of the beam 40 supplying a representative signal to a selection circuit 60. From the selection circuit 60, portions of the signal are applied to a comparator 62 which also receives a representative signal from a register 64. The comparator 62 is coupled to a signal apparatus 66 for manifesting the results of a comparison. These structures may take various forms including the forms disclosed in the referenced U.S. Pat. No. 4,423,415. In that regard, the operations may be reduced to a digital format and various forms of timing and control structures are available from the prior art. Specifically in that association, the document 36 is positioned and moved as illustrated by a document holder or transport 68. A control unit 70 actuates the document transport 68 and the selection circuit 60.

Essentially, as disclosed in the above-referenced U.S. Pat. No. 4,423,415, any number of areas (windows) might be observed for a referenced characteristic (translucency) which characteristic is recorded for comparison with test characteristic values sensed at subsequent times. Of course, a favorable comparison authenticates the document. In that regard, a simplistic operating mode for the system of FIG. 3 may verify a document by sensing a single window, the area of which coincides to the sectional area of the beam 40 (FIG. 3). That is, the document is immobile at the time of sensing, stopped in place by the document transport 68 and positioned so that the window of observation coincides to the beam 40. Positioning might be accomplished with reference to a document edge or indicia on the document as known in the prior art. Previously observed characteristic data is stored in the register 64. Consider the detailed operating sequence.

As indicated above, from a previous sensing, a characteristic data value is contained in the register 64. The value indicates the translucency characteristic of the document 36 at the window of interest. The value might simply be a digital numerical representation indicative of the translucency of the window of concern. The document 36 is positioned so that the window (area of interest) is substantially under the beam 40. Specifically, above the document 36 (FIG. 3) the beam 40 is represented in cross-section having been focused by the lens 42, selected by the mask 44, and modulated into zones by the filter 46. Accordingly, the beam 40 comprises three distinct concentric sections which might be termed dissecting pixels. Specifically, the external section or ring P1 has a relative intensity value of "one"; the internal ring or pixel P2 has a relative intensity value of "two" and the core or center section P3 has a relative intensity value of "three". Thus, the beam 72 is fragmented into three fragments which are termed pixels P1, P2 and P3 for dissecting a defined window on the document 36 for sensing.

At this point in the explanation, it can be appreciated that in aligning the document 36 to sense a specific window, it is very likely that the central pixel P3 of the beam 72 will impinge within the specified window. That is, misalignment variations will tend to affect the pixels P1 and P2 (external rings) of the beam 40. Consequently, with the enhanced significance of the center pixel P3, the tolerance of misalignment is increased.

The modulated beam 40 of weighted pixels impacts on the document 36 and is further modulated by the translucency of the document 36 at the window of impingement. If the document 36 comprises paper, for example, opacity variations are evident simply by observing the sheet placed in front of a light source.

The modulated light beam emerging from the paper 36 is still further modulated by passing through a filter 54 (similar to the filter 46). The filter 54 further enhances the significance of the center pixel P3 of the beam by diminishing the intensity of the exterior areas. So modulated, the beam impacts the photosensor 56 to provide an electrical signal representative of the instant translucency of the window. That signal is processed by the selection circuit 60 and may be reduced to a digital value which is supplied to the comparator 62 for correlation with a previously observed value from the register 64. Substantial or nearly substantial coincidence between the two values prompts the comparator 62 to supply an approval signal to the apparatus 66 for manifesting verification of the document. The degree of coincidence is observed somewhat more accurately in the face of window misalignments by enhancing the significance of the central portion or central picture elements of the observed window. Thus, in accordance herewith, windows can be effectively reduced in size (area).

In a more complex operating mode, the system of FIG. 3 may sense the document 36 at several windows as the document is moved continuously under the beam 40 by the transport 68. For such operation the document transport 68 may take various forms as disclosed in the prior art, for example, in the above-referenced U.S. Pat. No. 4,423,415. Also as described in that patent, the system of FIG. 3 may incorporate apparatus in the selector circuit 60 and transport 68 for cooperative operation to isolate data from select areas or windows of the document. In one operating format, indicia 12 (FIG. 1) may be used on the document 36 (FIG. 3) to define a corner for a field 14 (FIG. 1). From such a corner individual windows are selected. As illustrated in FIG. 4, the line or indicia 12 may define a scanning track 74 swept by the modulated beam 40 passing through the filter 46. As the beam 40 impinges select locations (windows) an observed representative signal is sampled to provide sensed data values for comparison with registered data values. Such dynamic operation will now be considered in greater detail.

The document transport 68 (FIG. 3) incorporates apparatus for moving the document 36 and sensing indicia 12 (FIG. 4) to identify the instants when the beam 72 impinges the area of a predetermined window. The operation involves monitoring the indicia 12 (FIG. 4) and one form of such apparatus is shown and described in the above-referenced U.S. Pat. No. 4,423,415 along with a form of apparatus which may be employed as the control unit 70 and the selection circuit 60. Essentially, the control unit 70 cooperates with the document transport 68 in determining the instants when the beam 40 impinges a window and accordingly actuates the selection circuit 60 to sample the observed analog signal provided by the photosensor 56. Such individual samples manifest the translucency observation and may be further processed then supplied to the comparator 62 for correlation with respect to stored reference values from the register 64. Again, illustrative forms of such structures are shown and described in the above-referenced U.S. Pat. No. 4,423,415. As with the static sensing system, it is again evident that by dissecting a window into areas (pixels) of weighted significance tolerance to window misalignment is increased. As indicated above, various other structures and techniques may be employed to accomplish the desired result. For example, pixels may be lapped to attain weighting or individual pixels may be arithmetically weighted. A system for an arithmetically weighted method will now be considered.

Figure 5:
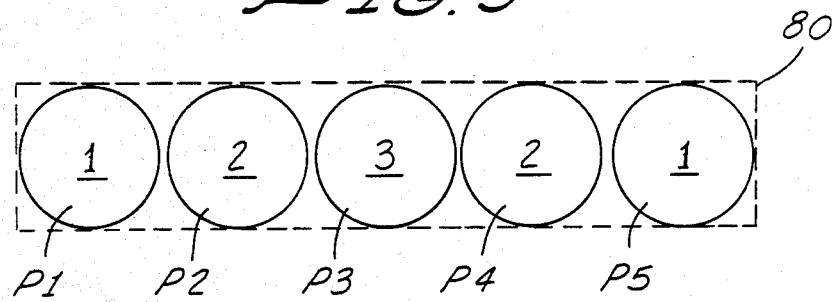
FIG. 5 is a diagram illustrative of the operation of another system in accordance with the present invention.

Referring to FIG. 5, a rectangular window 80 is indicated by dashed lines. As explained above, the window constitutes an area on a document that is to be sensed by radiation. The radiation emanating from the document manifests a characteristic of the document, e.g. translucency. As indicated above, an important feature of the present invention resides in increasing the tolerance of the system for locating windows during repeated sensings to authenticate the article. Among other things, that feature allows the windows to be of reduced size.

As illustrated in FIG. 5, the window 80 is dissected by five pixels, specifically pixels P1, P2, P3, P4 and P5. Such dissection along with associated sensing of characteristic values at the pixels may be accomplished using a variety of techniques and apparatus. For example, a flying spot scanner might move along the linear path of the window 80 while the resulting photo signal is selectively sampled at the instant when the scanner dwells to sense the pixels P1 through P5. Alternatively, a bank or linear array of photocells might concurrently sense the areas of pixels P1 through P5 to provide resultant signals.

With the sensing of signals manifesting characteristic values of the pixels P1 through P5, the pixel signals are weighted arithmetically. Specifically, for example, the central pixel P3 might be accorded a relative significance of "three". The interior pixels P2 and P4 might be accorded a relative significance of "two" while the external pixels P1 and P5 might be accorded a relative significance of "one". Thus, as explained above, weighting attributes greater significance to the centrally located pixels to obtain the increased tolerance as indicated. A system utilizing the technique as described above with respect to FIG. 5 will now be considered.

Figure 6:
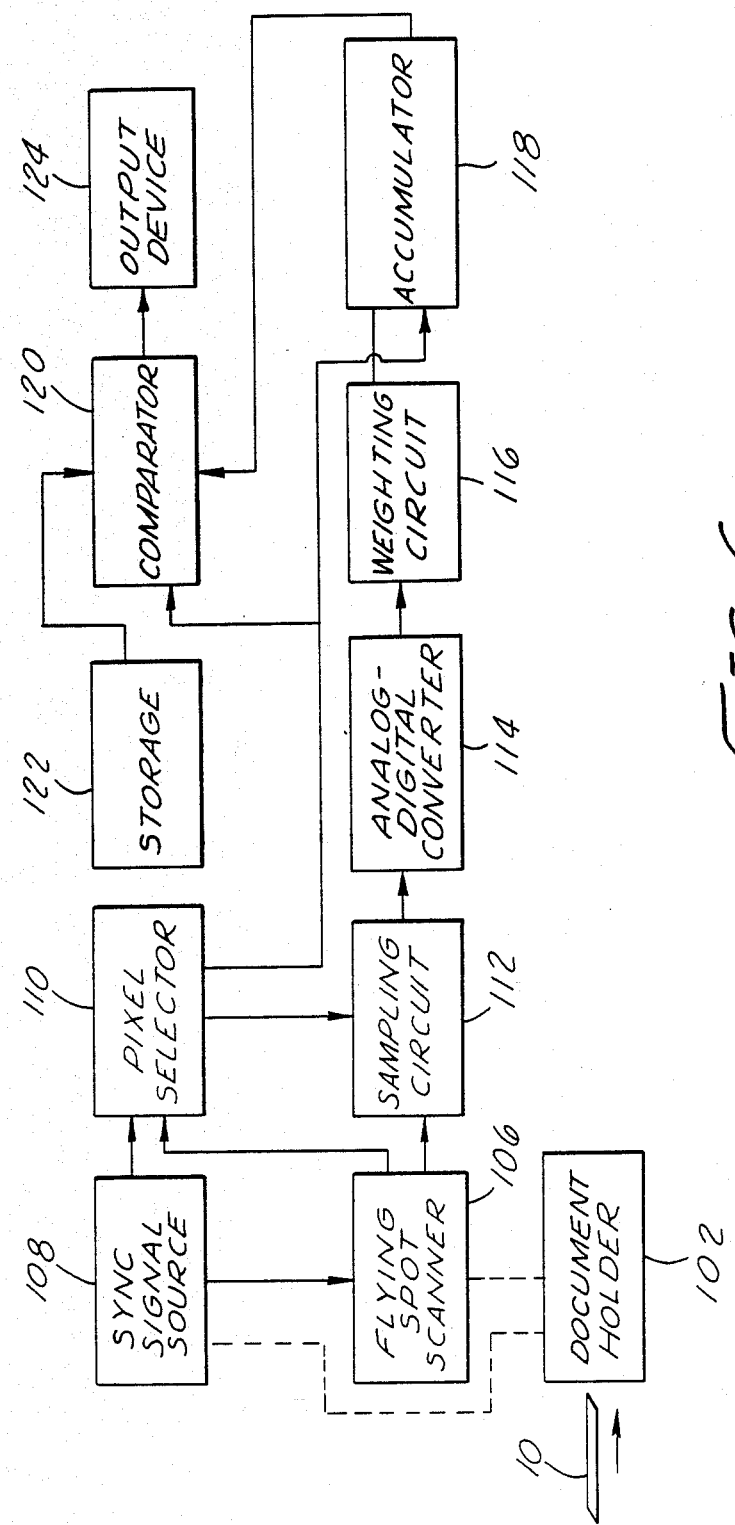
FIG. 6 is a block diagram of an alternative system in accordance with the present invention.

Referring to FIG. 6, a document holder 102 (lower left) is depicted receiving a document 10 (FIG. 1). The document holder 102 (FIG. 6) is associated with a flying spot scanner 106 for sensing a field 14 (FIG. 1). The document holder 102 also is coupled for associative operation with a sync signal source 108 which in turn is coupled to the flying spot scanner 106 and a pixel selector 110.

Generally, the flying spot scanner 106 (FIG. 6) scans the field 14 (FIG. 1) in a raster pattern in accordance with well known video techniques. The scanner 106 is synchronized by horizontal and vertical synchronizing signals from the source 108 which receives timing and positioning signals from the document holder 102. The sync signal source 108 also supplies signals to the pixel selector 110 which is in turn connected to a sampling circuit 112. Essentially, at instants when a pixel of interest is being sensed, the pixel selector 110 triggers the sampling circuit 112 to supply an analog data signal to an analog-digital converter 114. Specifically, the sampling circuit 112 provides analog values at precisely the instants when the flying spot scanner 106 is sensing the pixels P1, P2, P3, P4 and P5 in the window 80 on the card 10. The resulting analog values are converted to digital representations by the converter 114. The digitized values then are weighted, depending upon window position, by a weighting circuit 116. The circuit 116 performs algebraic processing as to multiply pixel values by different factors. For example, referring to FIG. 5, a center pixel signal (for convenience also labeled P3) might be multiplied by a value of "three". The pixel signal values for pixels P2 and P4 are multiplied by a value of "two" and the external pixel signals P1 and P5 are simply multiplied by unity or passed without change.

The resulting weighted pixel values are provided (as representative signals) from the weighting circuit 116 to an accumulator 118 which sums the individual weighted pixel values to obtain a total. That total value is represented by a signal supplied from the accumulator 118 to a comparator 120. Note that the accumulator 118 is connected to the sync signal source 108 and receives timing signals definitive of the window 80. By such signals, the accumulator provides total signal representations and is cleared.

The comparator 120 is connected to the sync signal source 108 and accordingly is actuated concurrently with the delivery of signal representations from the accumulator 118. That is, when the weighted pixels of a window have been summed by the accumulator 118, a digitally represented value is supplied to the comparator 120 from the accumulator 118 for correlation with a similarly represented reference value from storage 122. Various forms of comparators and correlators are well known and widely used in various data processing arts. The results of the correlation are indicated to an output device 124. Essentially, a favorable comparison or correlation between the stored reference value and the freshly sensed or developed value actuates the output device 124 to indicate that the document 10 is authentic. Otherwise no such indication is provided.

In the operation of the system of FIG. 6 as considered above, the pixel selector 110 is adjusted to provide a predetermined number of pixels for a window, e.g. five pixels for the window 80 as illustrated in FIG. 5. Also, the weighting circuit 116 would be adjusted to provide appropriate multipliers for emphasizing the significance of centrally located pixels. For example, as illustrated in FIG. 5, the signal values for pixels P1 and P5 were explained to be multiplied by unity while the pixels P2 and P4 were multiplied by "two" and the central pixel P3 was multiplied by "three". The operation of the comparator 120 may be varied to establish a varying degree of coincidence between the reference and sensed values for providing an approved signal to the output device 124.

Figure 7:
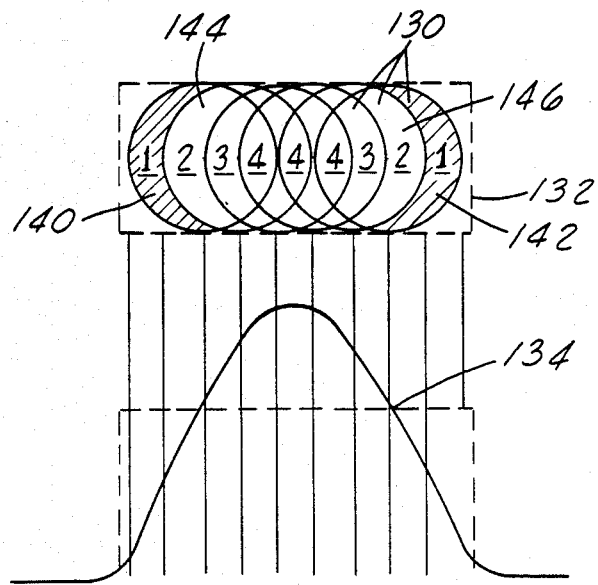
FIG. 7 is a diagram illustrative of the operation of still another system in accordance with the present invention.

In an alternative operating format, the pixels are differently selected and weighted. Generally, the pixels are overlapped to accomplish the central zone weighting. The process and method of weighting by overlapped pixels are illustrated by FIG. 7. Specifically, a series of lapped pixels 130 are represented in a window 132. The degree of overlap by the pixels is represented by the numbers "one", "two", "three" and "four". That is, the numerical designations can be thought of as indicating the depth of pixels. The fragments 140 and 142 of pixels are contained in a single pixel (external) and therefore are designated "one". The adjacent somewhat "moon shaped" areas 144 and 146 are two pixels "deep" and accordingly are designated "two". Areas of still greater pixel "depth" are designated "three" and "four". The treatment of pixel "depth" is representative of the pixel signal values that are developed by additively combining the lapped pixels. Accordingly, as each of the pixels is sampled and accumulated, the lapped configuration accomplishes the weighting as illustrated by a curve 134. Thus, the central portion of the window 132 is given increased significance or weight.

To accomplish the lapped weighting operation as illustrated in FIG. 7, components of the system of FIG. 6 simply are adjusted so that the pixel selector 110 actuates the sampling circuit 112 at each of the lapped positions (pixels 13) as the flying spot scanner 106 senses a window 132. Accordingly, individual samples, as represented by pixels 130 in FIG. 7, are converted to a digital format and passed without change through the weighting circuit 116. That is, in this mode of operation the weighting circuit 116 does not alter received values. Rather, the weighting circuit can be set to bypass values or alternatively the circuit 116 can be set to multiply all values by a singular factor, e.g. "one". The lapped sample values are then totaled by the accumulator 118 to accomplish a sum somewhat as represented by the area under the curve 134. Accordingly, as illustrated, the dissection of the window 132 by pixels is provided, again to emphasize the central section of the window. Of course, the reference or comparison value (contained) in the storage 122 is similarly sensed as provided from the storage 122. Again, a favorable comparison produces an approval signal from the comparator 120 to manifest authentication by the output device 124.

From the above explanations it will be apparent that systems in accordance with the present invention may be variously constructed using a wide variety of techniques to accomplish pixel weighting to attribute greater significance for internal or central areas of a window. Consequently, the scope hereof should be determined in accordance with the claims as set forth below.

What is claimed is:

1. A method of sensing a characteristic of an aritcle, as a document, by radiation from a specified window area of said article, comprising the steps of:
   determining a located window area of said article with the objective that said located window area coincides in area and location with said specified window area;

sensing radiation from said located window area of said document by pixels to provide representative pixel signals for said located window area, thereby increasing the tolerance of the system to misalignment of the located window area with the specified window area;

weighting said representative pixel signals to enhance those specific pixel signal values that are centrally positioned in said located window area; and processing said weighted pixel signal values by additive combination to provide characteristic data signals representative of said document characteristic at said specified window area and wherein said pixel signal values that are centrally positioned in said located window area are accorded greater significance.

2. A method according to claim 1 wherein said weighting step comprises using radiation filter means for varying said radiation from said located window area.

3. A method according to claim 1 wherein said weighting step comprises lapping said pixels to accomplish said weighting.

4. A method according to claim 1 wherein said weighting step comprises algebraically processing said pixel signals.

5. A method according to claim 1 wherein said step of sensing radiation comprises sensing radiation transmitted through said article.

6. A method according to claim 1 further including the step of illuminating said article to provide said radiation.

7. A method according to claim 1 and further including a step of correlating said characteristic data signals with stored values.

8. A radiation system for sensing characteristic data from a select area of an object under investigation as a document, comprising:

sensing means to sense radiation from said object as data indicative of a characteristic of said object;

selection means defining a window of observation for an area of said object to substantially coincide with said select area in area and location;

weighted pixel means controlled by said selection means to dissect said window by controlling said sensing means to sense said window by pixels with weighted pixel significance at the central portion of said window of observation to enhance such pixel values at the central portion of said window of observation thereby increasing the tolerance of the system to misalignment of the select area with said window of observation; and means to combine said sensed pixels with weighted pixel significance to provide a charachteristic representation for said object.

9. A system according to claim 8 wherein said weighted pixel means comprises filter means for selectively passing said radiation from said object.

10. A system according to claim 8 wherein said weighted pixel means comprises means for lapping said pixels to attain said weighted significance.

11. A system according to claim 8 wherein said weighted pixel means comprises arithmetic means for algebraically varying the value of said pixels as sensed.

12. A system according to claim 8 wherein said means to combine comprises adder means to form characteristic signals.

13. A system according to claim 8 further including means for testing said characteristic representation as to authenticate said document.

14. A system according to claim 13 wherein said means for testing includes storage means for a comparison representation.

* * * * *